United States Patent
Wang et al.

(10) Patent No.: US 10,664,106 B2
(45) Date of Patent: May 26, 2020

(54) ELECTROMAGNETIC CAPACITIVE TOUCH SCREEN INCLUDING A CAPACITIVE MODULE AND AN ELECTROMAGNETIC MODULE LOCATED ON A SAME LAYER

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Qingpu Wang, Beijing (CN); Lei Zhang, Beijing (CN); Xiaodong Xie, Beijing (CN); Ting Zeng, Beijing (CN); Jun Chen, Beijing (CN)

(73) Assignees: BOE TECHNOLOGY GROUP CO., LTD., Beijing (CN); HEFEI XINSHENG OPTOELECTRONICS TECHNOLOGY CO., LTD, Anhui (CN)

( * ) Notice: Subject to any disclaimer, the term of this patent is extended or adjusted under 35 U.S.C. 154(b) by 51 days.

(21) Appl. No.: 15/306,336

(22) PCT Filed: Feb. 18, 2016

(86) PCT No.: PCT/CN2016/074011
§ 371 (c)(1),
(2) Date: Oct. 24, 2016

(87) PCT Pub. No.: WO2017/049856
PCT Pub. Date: Mar. 30, 2017

(65) Prior Publication Data
US 2017/0269731 A1    Sep. 21, 2017

(30) Foreign Application Priority Data

Sep. 25, 2015  (CN) .......................... 2015 1 0621518

(51) Int. Cl.
G06F 3/045    (2006.01)
G06F 3/044    (2006.01)
(Continued)

(52) U.S. Cl.
CPC .............. *G06F 3/044* (2013.01); *G06F 3/046* (2013.01); *G06F 3/047* (2013.01); *G06F 2203/04106* (2013.01); *G06F 2203/04111* (2013.01)

(58) Field of Classification Search
None
See application file for complete search history.

(56) References Cited

U.S. PATENT DOCUMENTS

| 4,734,546 A | 3/1988 | Landmeier |
| 2012/0033168 A1* | 2/2012 | Hwang ............... G02F 1/13338 349/139 |

(Continued)

FOREIGN PATENT DOCUMENTS

| CN | 102375612 | 3/2012 | |
| CN | 102375612 A * | 3/2012 | ............. G06F 3/044 |

(Continued)

OTHER PUBLICATIONS

Definition of module, www.google.com, p. 1.*
(Continued)

*Primary Examiner* — Lunyi Lao
*Assistant Examiner* — Kirk W Hermann
(74) *Attorney, Agent, or Firm* — Dave Law Group LLC; Raj S. Dave

(57) ABSTRACT

Embodiments of the present disclosure provide an electromagnetic capacitive touch screen. According to one embodiment, the electromagnetic capacitive touch screen comprises: a display module, a capacitive module that comprises a plurality of capacitive induction units, and an electromag-
(Continued)

netic module that comprises a plurality of electromagnetic induction units comprising a plurality of electromagnetic induction lines, wherein the capacitive module and the electromagnetic module are located on the same layer.

9 Claims, 6 Drawing Sheets

(51) Int. Cl.
*G06F 3/046* (2006.01)
*G06F 3/047* (2006.01)

(56) References Cited

U.S. PATENT DOCUMENTS

| | | | | |
|---|---|---|---|---|
| 2015/0185048 A1* | 7/2015 | Liu | ............................ | G01D 5/20 |
| | | | | 345/174 |
| 2015/0185928 A1* | 7/2015 | Son | ........................... | G06F 3/016 |
| | | | | 345/174 |
| 2015/0293560 A1* | 10/2015 | Choi | ....................... | G06F 3/0412 |
| | | | | 345/174 |
| 2016/0124562 A1* | 5/2016 | Lu | ........................... | G06F 3/0412 |
| | | | | 345/174 |
| 2016/0139701 A1 | 5/2016 | Wang | | |
| 2016/0154511 A1* | 6/2016 | Yao | ......................... | G06F 3/0412 |
| | | | | 345/174 |

FOREIGN PATENT DOCUMENTS

| | | | | |
|---|---|---|---|---|
| CN | 102375612 A | * | 3/2012 | ............. G06F 3/044 |
| CN | 102541384 A | * | 7/2012 | |
| CN | 102955639 | | 3/2013 | |
| CN | 202976043 U | * | 6/2013 | |
| CN | 103885654 A | | 6/2014 | |
| CN | 103941946 A | | 7/2014 | |
| CN | 104298411 A | | 1/2015 | |
| CN | 104714707 A | | 6/2015 | |
| CN | 105204702 A | | 12/2015 | |
| CN | 205050123 | | 2/2016 | |
| KR | 1020140035789 | | 3/2014 | |

OTHER PUBLICATIONS

Definition of transverse, www.google.com, p. 1.*
Definition of longitudinal, www.google.com, p. 1.*
Dictionary.com definition of on, https://www.dictionary.com/browse/on?s=t, p. 1 (Year: 2018).*
Dictionary.com definition of longitudinal, https://www.dictionary.com/brows/longitudinal?s=t, p. 1 (Year: 2018).*
Written Opinion of the International Searching Authority from corresponding PCT Application No. PCT/CN2016/074011, dated Jul. 1, 2016 (4 pages).
Office Action from corresponding Chinese Application No. 201510621518.1, dated Aug. 1, 2017 (6 pages).
Office Action from corresponding Korean Application No. 10-2017-7001122 dated Sep. 11, 2017 (7 pages).
Extended European Search Report from European Application No. 16781271.8 dated Apr. 8, 2019 (9 pages).

* cited by examiner

ELECTROMAGNETIC CAPACITIVE TOUCH SCREEN INCLUDING A CAPACITIVE MODULE AND AN ELECTROMAGNETIC MODULE LOCATED ON A SAME LAYER

CLAIM OF PRIORITY

The present disclosure claims priority of Chinese patent application No. 201510621518.1 filed on Sep. 25, 2015 and hereby cites full-text of the content disclosed by the above mentioned Chinese patent application as a part of the present application.

TECHNICAL FIELD

Embodiments of the present disclosure relate to the touch screen field, and particularly relate to the field of electromagnetic touch field and capacitive touch field.

BACKGROUND

In the touch screen field, according to different working principles, there are various kinds of types such as resistive touch screen, capacitive touch screen, electromagnetic touch screen, infrared touch screen, acoustic touch screen etc.

Currently, the most widely used touch screen is capacitive touch screen. A capacitive touch screen distinguishes the touch position by sensing the mutual capacitance of a finger touch. The capacitive touch controlling supports the multi-touch function and has a higher light transmittance and a lower overall power consumption, and the contact surface hardness thereof is high, there is no need to press and it has a longer service life.

The electromagnetic touch screen at present generally uses a back-attached electromagnetic antenna board that is formed of metal wires in a crisscross pattern and determines position information by sensing the induction electromotive force of an electromagnetic pen when sliding on the screen. Precision of an electromagnetic touch screen is much higher than that of a capacitive touch screen.

Currently, in order to achieve hand-pen dual touch controlling, a capacitive touch screen and an electromagnetic touch screen are used superposedly in general. Generally, an electromagnetic antenna board is disposed on the back side of a display panel while the capacitive touch controlling module is disposed on the display panel or embedded in the display panel.

SUMMARY

Inventor of the present disclosure finds out that the aforementioned hand-pen dual touch controlling mode has the following disadvantages: firstly, the whole touch controlling product has a complicated structure, a large volume and a great thickness; secondly, the production cost is high.

In order to solve the aforementioned problems, embodiments of the present disclosure provide an electromagnetic capacitive touch screen that may have a simple product structure, a small volume, a small thickness and a low cost while having both of hand and pen touch controlling functions. Specifically, the present disclosure provides the following technical solutions.

[1] An electromagnetic capacitive touch screen, comprising:
a display module,
a capacitive module that comprises a plurality of capacitive induction units, and
an electromagnetic module that comprises a plurality of electromagnetic induction units comprising a plurality of electromagnetic induction lines, wherein
the capacitive module and the electromagnetic module are located on the same layer.

In the aforementioned electromagnetic capacitive touch screen according to [1], a capacitive module and an electromagnetic module are disposed on the same side of a display module and located on the same layer. Therefore, the electromagnetic capacitive touch screen may make the product have a simple structure, a small volume and a small thickness at the same time when achieving a hand-pen dual touch controlling function and may significantly reduce the production cost.

[2] The electromagnetic capacitive touch screen according to technical solution [1], wherein
the plurality of capacitive induction units and the plurality of electromagnetic induction units are arranged alternately.

In the electromagnetic capacitive touch screen according to [2], the plurality of capacitive induction units and the plurality of electromagnetic induction units are arranged alternately so as to effectively achieve the hand-pen dual touch controlling function.

[3] The electromagnetic capacitive touch screen according to technical solution [1] or [2], wherein
at least two transverse electromagnetic induction lines are disposed between two adjacent rows of capacitive induction units arranged in transverse direction, and current directions in the at least two transverse electromagnetic induction lines are opposite.

[4] The electromagnetic capacitive touch screen according to any one of technical solutions [1] to [3], wherein
at least two longitudinal electromagnetic induction lines are disposed between two adjacent columns of capacitive induction units arranged in longitudinal direction, and current directions in the at least two longitudinal electromagnetic induction lines are opposite.

In the electromagnetic capacitive touch screen according to [3] and [4], electromagnetic induction lines whose current directions are opposite are disposed in transverse direction and/or in longitudinal direction so as to effectively achieve the electromagnetic touch controlling function.

[5] The electromagnetic capacitive touch screen according to any one of technical solutions [1] to [4], wherein
one of the at least two transverse electromagnetic induction lines and the at least two longitudinal electromagnetic induction lines are connected through a bridging structure at a position where the two are crossed insulatively.

[6] The electromagnetic capacitive touch screen according to any one of technical solutions [1] to [5], wherein
the at least two transverse electromagnetic induction lines constitute a group of transverse electromagnetic induction lines, the at least two longitudinal electromagnetic induction lines constitute a group of longitudinal electromagnetic induction lines, and a plurality of groups of the transverse electromagnetic induction lines and a plurality of groups of the longitudinal electromagnetic induction lines are arranged in a crisscross pattern.

[7] The electromagnetic capacitive touch screen according to any one of technical solutions [1] to [6], wherein
at least one of the capacitive induction units is disposed in regions surrounded by each two adjacent groups of transverse electromagnetic induction lines and each two adjacent groups of longitudinal electromagnetic induction lines.

In the electromagnetic capacitive touch screen according to [2], the capacitive induction units are disposed in a region surrounded by electromagnetic induction lines arranged in a crisscross pattern so as to effectively achieve the hand-pen dual touch controlling function.

[8] The electromagnetic capacitive touch screen according to any one of technical solutions [1] to [7], wherein
the capacitive induction units disposed in the adjacent regions are connected through a bridging structure.

[9] The electromagnetic capacitive touch screen according to any one of technical solutions [1] to [8], wherein
the capacitive induction units comprise mutual capacitive induction units that comprise at least one drive electrode and at least one induction electrode.

In the electromagnetic capacitive touch screen according to [9], a capacitive touch controlling function is achieved by a mutual capacitive induction voltage so as to take advantages of the mutual capacitive touch screen.

[10] The electromagnetic capacitive touch screen according to any one of technical solutions [1] to [9], wherein
in case where the mutual capacitive induction units comprise two or more drive electrodes and two or more induction electrodes, one of the drive electrodes and the induction electrodes are connected through a bridging structure.

[11] The electromagnetic capacitive touch screen according to any one of technical solutions [1] to [10], wherein
drive electrodes of two adjacent capacitive induction units are connected through a bridging structure.

[12] The electromagnetic capacitive touch screen according to any one of technical solutions [1] to [11], wherein
induction electrodes of two adjacent capacitive induction units are connected through a bridging structure.

[13] The electromagnetic capacitive touch screen according to any one of technical solutions [1] to [12], wherein
the bridging structure comprises an insulating layer and a bridging electrode layer, wherein the bridging electrode layer is located above an electrode layer of the capacitive induction units or the electromagnetic induction lines with the insulating layer therebetween.

[14] The electromagnetic capacitive touch screen according to any one of technical solutions [1] to [13], wherein
the insulating layer comprises a polymer-type covering layer or an inorganic-type passivation layer.

[15] The electromagnetic capacitive touch screen according to any one of technical solutions [1] to [14], wherein
the electrode layer or the bridging electrode layer is made by using at least one material of indium tin oxide, nano-silver, Al, Cu and Mo.

In the electromagnetic capacitive touch screen according to [10] to [15], it may achieve the hand-pen dual touch controlling function with a simple structure and may reduce the production cost through a bridging structure.

[16] The electromagnetic capacitive touch screen according to any one of technical solutions [1] to [15], wherein
electrodes of the capacitive induction units and the electromagnetic induction lines are located on the same layer.

[17] The electromagnetic capacitive touch screen according to any one of technical solutions [1] to [16], wherein
drive electrode and/or induction electrode of the mutual capacitive induction units and the electromagnetic induction lines are located on the same layer in case where the capacitive induction units are mutual capacitive induction units.

BRIEF DESCRIPTION OF THE DRAWINGS

In order to describe the technical solutions of the embodiments of the present disclosure more clearly, drawings of the embodiments will be briefly described below. Obviously, the drawings described below merely relate to some embodiments of the present disclosure, other than restrictions to the present disclosure.

DETAILED DESCRIPTION

In order to clarify the objective, technical solutions and advantages of the embodiments of the present disclosure, the technical solutions of the embodiments of the present disclosure will be clearly and completely described in conjunction with the drawings below. Obviously, the embodiments to be described refer to a part of the embodiments of the present disclosure, other than all of the embodiments. On the basis of the embodiments of the present disclosure to be described, all other embodiments those skilled in the art obtain requiring no inventive effort also belong to the scope protected by the present disclosure.

In the description of the present disclosure, it should be noted that the orientation or position relationship indicated by terms such as "upper", "lower", "top" and "bottom" refer to orientation or position relationship indicated by the drawings, and they are only to facilitate describing the present disclosure and simplifying the description, rather than indicting or suggesting that the device or elements must have the specific orientation, constructed in the specific orientation and operated, and thus shall not be construed as limiting the present disclosure.

In addition, in the description of the present disclosure, except as otherwise stated, meaning of the term "a plurality of" is two or more than two.

Below, the respective preferable embodiments of the present disclosure will be described specifically in conjunction with the drawings.

Figure 1:
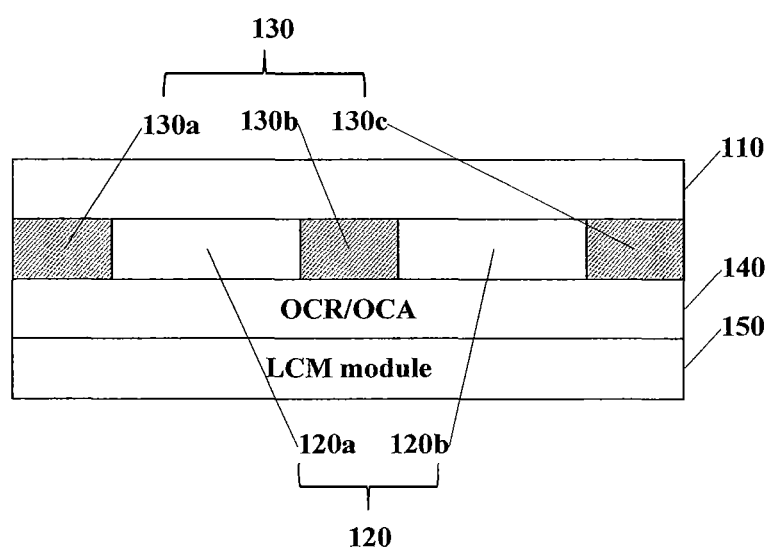
FIG. 1 is a sectional view of an electromagnetic capacitive touch screen according to an embodiment of the present disclosure.

FIG. 1 is a sectional view of an electromagnetic capacitive touch screen according to an embodiment of the present disclosure. As shown in FIG. 1, the electromagnetic capacitive touch screen according to the embodiment comprises a display module 150, a capacitive module 120 that comprises a plurality of capacitive induction units 120a, and an electromagnetic module 130 that comprises a plurality of electromagnetic induction units 130a comprising a plurality of electromagnetic induction lines, wherein the capacitive module 120 and the electromagnetic module 130 are on the same side of the display module 150 and located on the same layer.

The display module of the embodiment can be any of display modules in the art, such as a liquid crystal display module (LCM module), an electrophoretic display module etc. The present disclosure has no limitation hereto, as long as it can display.

In the embodiment, the capacitive module 120 and electromagnetic module 130 are on the same side of the display module 150 and located on the same layer. Preferably, electrodes of the capacitive induction units and the electromagnetic induction lines are located on the same layer. Furthermore, the capacitive module 120 and electromagnetic module 130 are adhered to the display module 150 preferably through e.g. an Optically Clear Adhesive (OCA) or an Optical Clear Resin (OCR). It will be appreciated that the capacitive module 120 and electromagnetic module 130 may be joined with the display module 150 in other forms in the embodiment, and the present disclosure has no limitation to the joining form.

Furthermore, in an embodiment, a protection module 110 is preferably disposed on the capacitive module 120 and electromagnetic module 130. It will be appreciated that the protection module 110 may use any material in the art such as glass or an organic material and the present disclosure has no limitation hereto.

In the electromagnetic capacitive touch screen according to the embodiment, the capacitive module 120 and electromagnetic module 130 are disposed on the same side of the display module 150 and located on the same layer. Therefore, the electromagnetic capacitive touch screen may make the product have a simple structure, a small volume and a small thickness at the same time when achieving a hand-pen dual touch controlling function and may significantly reduce the production cost.

In an embodiment, as shown in FIG. 1, the plurality of capacitive induction units 120*a* and the plurality of electromagnetic induction units 130*a* are preferably arranged alternately. It will be appreciated that the concrete arranging form of the plurality of capacitive induction units 120*a* and the plurality of electromagnetic induction units 130*a* may be selected according to actual demands, as long as there are capacitive induction units and electromagnetic induction units at respective positions of the touch screen so as to achieve both of finger touch function and electromagnetic pen touch function at the respective positions of the touch screen. In addition, in the embodiment, number of the capacitive induction units and electromagnetic induction units may be selected according to demands and thus shall not be limited to the number as shown in FIG. 1.

The electromagnetic capacitive touch screen according to the embodiment may effectively achieve the hand-pen dual touch controlling function by interleaving the plurality of capacitive induction units 120*a* and the plurality of electromagnetic induction units 130*a* with each other.

Figure 2:
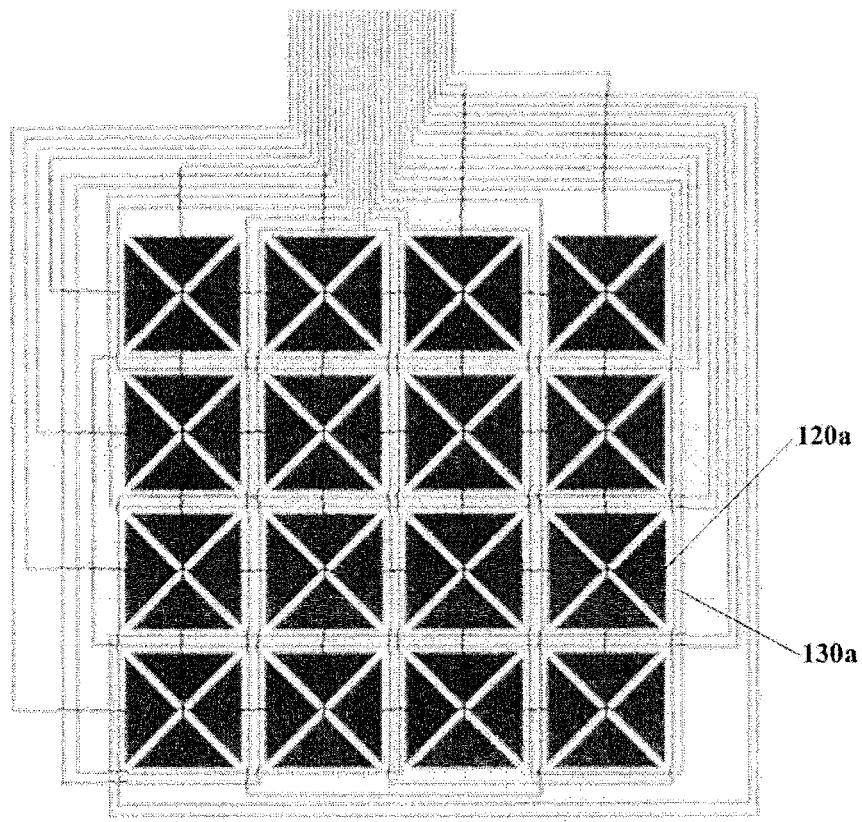
FIG. 2 is a schematic diagram of overall configuration of an electromagnetic capacitive touch screen according to an embodiment of the present disclosure.

Below, FIG. 2 will be taken as an example to specifically describe a preferable form of configuration relationship of capacitive induction units and electromagnetic induction units according to an embodiment. FIG. 2 is a plane diagram of overall configuration of an electromagnetic capacitive touch screen according to an embodiment of the present disclosure. As shown in FIG. 2, a plurality of capacitive induction units 120*a* are arranged vertically and horizontally and a plurality of electromagnetic induction units 130*a* are arranged in a crisscross pattern.

Generally, preferably at least two transverse electromagnetic induction lines are disposed between two adjacent rows of capacitive induction units arranged in transverse direction, and current directions in the at least two transverse electromagnetic induction lines are opposite. Preferably, at least two longitudinal electromagnetic induction lines are disposed between two adjacent columns of capacitive induction units arranged in longitudinal direction, and current directions in the at least two longitudinal electromagnetic induction lines are opposite. Preferably, one of the at least two transverse electromagnetic induction lines and the at least two longitudinal electromagnetic induction lines are connected through a bridging structure at a position where the two are crossed insulatively. Preferably, the at least two transverse electromagnetic induction lines constitute a group of transverse electromagnetic induction lines, the at least two longitudinal electromagnetic induction lines constitute a group of longitudinal electromagnetic induction lines, and a plurality of groups of the transverse electromagnetic induction lines and a plurality of groups of the longitudinal electromagnetic induction lines are arranged in a crisscross pattern. Preferably, at least one of the capacitive induction units is disposed in a region surrounded by two adjacent groups of transverse electromagnetic induction lines and two adjacent groups of longitudinal electromagnetic induction lines. Preferably, the capacitive induction units disposed in the adjacent regions are connected through the bridging structure. Preferably, the capacitive induction units comprise mutual capacitive induction units that comprise at least one drive electrode and at least one induction electrode. Preferably, one of the drive electrodes and the induction electrodes are connected through a bridging structure in case where the mutual capacitive induction units comprise more than two drive electrodes and more than two induction electrodes. Preferably, drive electrodes of two adjacent capacitive induction units are connected through a bridging structure. Preferably, induction electrodes of two adjacent capacitive induction units are connected through a bridging structure.

Figure 4:
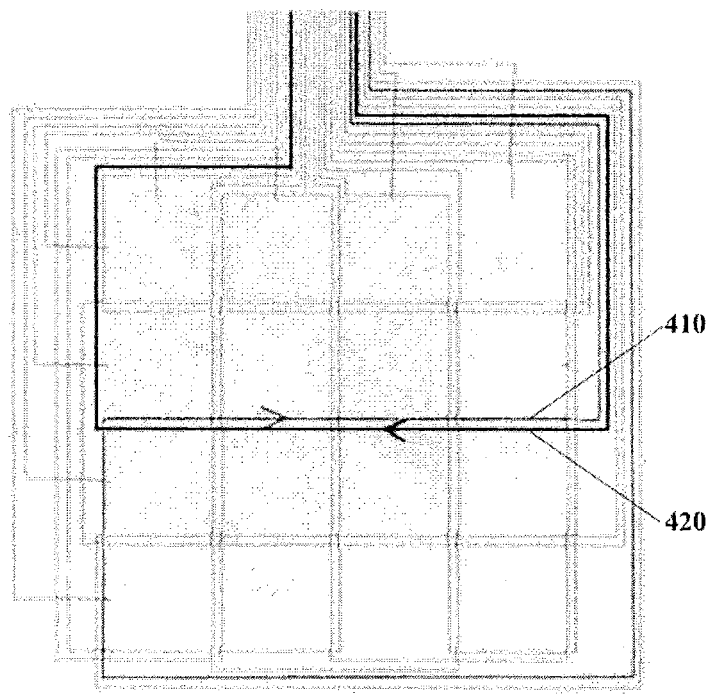
FIG. 4 is a schematic diagram of an electromagnetic induction coil of an electromagnetic capacitive touch screen according to an embodiment of the present disclosure.
Figure 5:
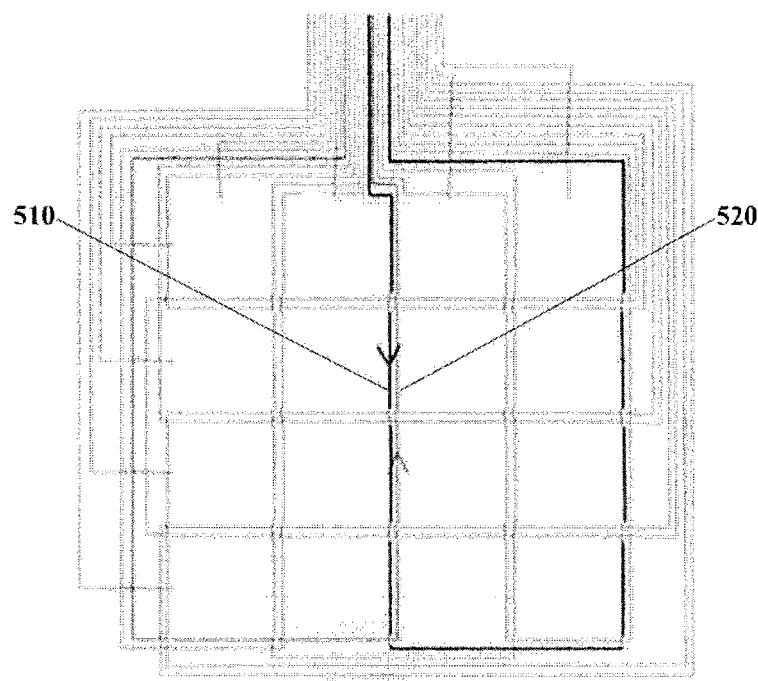
FIG. 5 is a schematic diagram of an electromagnetic induction coil of an electromagnetic capacitive touch screen according to an embodiment of the present disclosure.

Below, concrete configuration relationship of capacitive induction units and electromagnetic induction units will be specifically described by referring to FIGS. 3-5. It will be appreciated that the configurations of FIGS. 3-5 are only examples to specify preferable configuration relationships.

Figure 3:
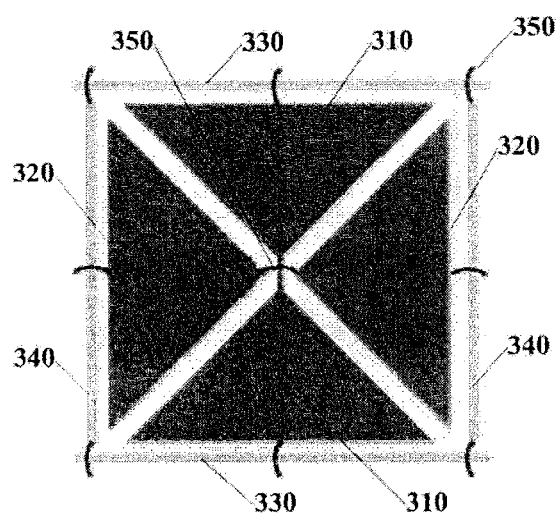
FIG. 3 is a schematic diagram of a pitch of an electromagnetic capacitive touch screen according to an embodiment of the present disclosure.

FIG. 3 is a schematic diagram of a pitch of an electromagnetic capacitive touch screen according to an embodiment of the present disclosure. In description of FIG. 3, it will be specified by taking an example where the capacitive induction units comprise mutual capacitive induction units.

As shown in FIG. 3, the mutual capacitive induction units comprise two drive electrodes 310 and two induction electrodes 320. In case where the drive electrodes and induction electrodes of the mutual capacitive induction units are located on the same layer, the drive electrodes and induction electrodes of the mutual capacitive induction units are preferably disposed on the same layer with the electromagnetic induction lines of the electromagnetic induction units. Furthermore, in case where the drive electrodes and induction electrodes of the mutual capacitive induction units are located on different layers, the drive electrodes of the mutual capacitive induction units may be disposed on the same layer with the electromagnetic induction lines of the electromagnetic induction units, and the induction electrodes of the mutual capacitive induction units may also be disposed on the same layer with the electromagnetic induction lines of the electromagnetic induction units.

Two drive electrodes 310 are connected through a wire located on the same layer, and two induction electrodes 320 are connected through a bridging structure 350. Here, though it shows that two induction electrodes 320 are connected through a bridging structure 350, two drive electrodes 310 may also be connected through a bridging structure. In addition, though it shows two drive electrodes and two induction electrodes, the number and configuration relationship of the drive electrodes and induction electrodes mat be set as required.

Electromagnetic induction lines in two vertical directions i.e. two longitudinal electromagnetic induction lines 340 and two transverse electromagnetic induction lines 330 are disposed on the periphery of the mutual capacitive induction units. Here, although two longitudinal electromagnetic induction lines 340 and two transverse electromagnetic induction lines 330 are shown, the number of longitudinal electromagnetic induction lines 340 and transverse electromagnetic induction lines 330 can be set according to actual demands.

As shown in FIG. 3, a longitudinal electromagnetic induction line 340 is connected with an adjacent longitudinal electromagnetic induction line via a bridging structure 350, and a transverse electromagnetic induction line 330 is connected with an adjacent transverse electromagnetic induction line directly, so that the longitudinal electromagnetic induction line 340 is insulating from each other with the transverse electromagnetic induction line 330 at a position where they cross. The drive electrode 310 is connected with an adjacent drive electrode 310 via a bridging structure 350, and an induction electrode 320 is connected with an adjacent induction electrode 320 via a bridging structure 350, so that the drive electrode 310 is insulating from each other with the induction electrode 320. It will be appreciated, though it is shown that the longitudinal electromagnetic induction line 340 is connected with an adjacent longitudinal electromagnetic induction line via a bridging structure 350, the transverse electromagnetic induction line 330 may be connected with an adjacent transverse electromagnetic induction line via a bridging structure 350, and the longitudinal electromagnetic induction line 340 may also be connected with an adjacent longitudinal electromagnetic induction line directly.

FIG. 4 is a schematic diagram of an electromagnetic induction coil of an electromagnetic capacitive touch screen according to an embodiment of the present disclosure. FIG. 5 is a schematic diagram of an electromagnetic induction coil of an electromagnetic capacitive touch screen according to an embodiment of the present disclosure.

As shown in FIG. 4, a transverse electromagnetic induction line 410 is adjacent to a transverse electromagnetic induction line 420, and the current directions thereof are opposite; the two constitute a transverse electromagnetic induction coil. As shown in FIG. 5, a longitudinal electromagnetic induction line 510 is adjacent to a longitudinal electromagnetic induction line 520, and the current directions thereof are opposite; the two constitute a longitudinal electromagnetic induction coil.

Below, returning to FIG. 2, a preferable form of the embodiment will be further described.

As shown in FIG. 2, drive electrodes of each column of longitudinally arranged capacitive induction units are connected with each other via a bridging structure, and induction electrodes of each row of transversely arranged capacitive induction units are connected with each other via a bridging structure. Here, positions of the drive electrodes and induction electrodes may further be exchanged.

Furthermore, as shown in FIG. 2, the electromagnetic induction lines are arranged in a crisscross pattern; two electromagnetic induction lines are disposed between two adjacent columns of capacitive induction units, and two electromagnetic induction lines are disposed between two adjacent rows of capacitive induction units. In other words, a capacitive induction unit is disposed in each region surrounded by electromagnetic induction lines arranged in a crisscross pattern.

In the electromagnetic capacitive touch screen according to the embodiment, electromagnetic induction lines are arranged in a crisscross pattern as mentioned above and capacitive induction units are arranged vertically and horizontally, which means that a pair of electromagnetic induction lines is disposed between each two capacitive induction units, and a capacitive induction unit is disposed between each two pairs of electromagnetic induction lines, so that a finger touch function may be achieved at each position of the electromagnetic capacitive touch screen by the capacitive induction units, and a pen touch function may be achieved at each position of the electromagnetic capacitive touch screen by the electromagnetic induction lines.

Below, a bridging structure will be specifically described by referring to FIGS. 6 and 7. It will be appreciated that FIGS. 6 and 7 are only examples to specify preferable bridging structures.

Figure 6:
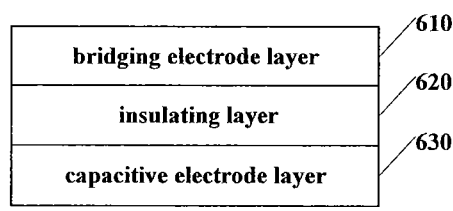
FIG. 6 is a schematic diagram of a capacitive module having a bridging structure therein of an electromagnetic capacitive touch screen according to an embodiment of the present disclosure.

FIG. 6 is a schematic diagram of a capacitive module having a bridging structure therein of an electromagnetic capacitive touch screen according to an embodiment of the present disclosure. FIG. 7 is a schematic diagram of an electromagnetic module having a bridging structure therein of an electromagnetic capacitive touch screen according to an embodiment of the present disclosure.

As shown in FIG. 6, a capacitive module having a bridging structure therein comprises: a capacitive electrode layer 630; an insulating layer 620 on the capacitive electrode layer 630; and a bridging electrode layer 610 on the insulating layer 620.

Figure 7:
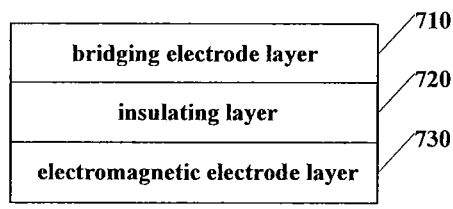
FIG. 7 is a schematic diagram of an electromagnetic module having a bridging structure therein of an electromagnetic capacitive touch screen according to an embodiment of the present disclosure.

As shown in FIG. 7, an electromagnetic module having a bridging structure therein comprises: an electromagnetic electrode layer 730; an insulating layer 720 on the electromagnetic electrode layer 730; and a bridging electrode layer 710 on the insulating layer 720.

In such a case, preferably, the capacitive electrode layer 630 and electromagnetic electrode layer 730 are disposed on the same layer, the insulating layer 620 and insulating layer 720 are disposed on the same layer, and the bridging electrode layer 610 and bridging electrode layer 710 are disposed on the same layer. Furthermore, the insulating layer 620 and insulating layer 720 are preferably formed of the same layer.

In an embodiment, the insulating layers 620, 720 preferably comprise a polymer-type covering layer or an inorganic-type passivation layer, and the present disclosure has no limitation hereto.

Furthermore, the capacitive electrode layer 630, electromagnetic electrode layer 730 and the bridging electrode layers 610, 710 are preferably made by using at least one material of indium tin oxide, nano-silver, Al, Cu and Mo, and the present disclosure has no limitation hereto.

Furthermore, though a mutual capacitive induction unit is taken as an example for description above, the capacitive induction units may also be a self capacitive induction unit. In such a case, electrodes of the self capacitive induction units are located on the same layer with electromagnetic induction lines of the electromagnetic induction units.

In the electromagnetic capacitive touch screen according to the embodiment, the bridging structure may achieve the hand-pen dual touch controlling function with a simple structure and may reduce the production cost. Furthermore, an electromagnetic capacitive touch screen according to one embodiment achieves a capacitive touch controlling function by a mutual capacitive induction voltage and it may take advantages of the mutual capacitive touch screen.

Below, working principle of an electromagnetic capacitive touch screen according to one embodiment will be described simply.

The basic working principle is as follow: when a finger touches the touch screen, a capacitive module is used to identify position information, and the mutual capacitance change caused by finger touch results in change of the receiver signal. Wave signals are given through drive electrodes and the wave signals are received through induction electrodes so as to identify the position information according to the difference of the wave signals. When an electromagnetic pen is used for operation, an induction is generated between the electromagnetic pen and the electromagnetic induction lines in the electromagnetic module in the operation process, and the touch position points are calculated by the caused change of the magnetic flux.

In the aforementioned electromagnetic capacitive touch screen according to the embodiment, a capacitive module and an electromagnetic module are disposed on the same layer of a display module. Therefore, the electromagnetic capacitive touch screen may make the product have a simple structure, a small volume and a small thickness at the same time when achieving a hand-pen dual touch controlling function and may significantly reduce the production cost. Furthermore, in an electromagnetic capacitive touch screen according to an embodiment, a plurality of capacitive induction units and a plurality of electromagnetic induction units are arranged alternately so as to effectively achieve the hand-pen dual touch controlling function. Furthermore, in an electromagnetic capacitive touch screen according to an embodiment, electromagnetic induction lines whose current directions are opposite are disposed in transverse direction and/or in longitudinal direction so as to effectively achieve the electromagnetic touch controlling function. Furthermore, in an electromagnetic capacitive touch screen according to an embodiment, the capacitive induction units are disposed in a region surrounded by electromagnetic induction lines arranged in a crisscross pattern so as to effectively achieve the hand-pen dual touch controlling function. Furthermore, in an electromagnetic capacitive touch screen according to an embodiment, a capacitive touch controlling function is achieved by mutual capacitive induction voltage so as to take advantages of the mutual capacitive touch screen. Furthermore, in an electromagnetic capacitive touch screen according to an embodiment, it may achieve the hand-pen dual touch controlling function with a simple structure and may reduce the production cost through a bridging structure.

Though several exemplary embodiments are described above to specifically specify the electromagnetic capacitive touch screen according to the present disclosure, the embodiments above are not exhaustive, and those skilled in the art may modify and vary the embodiments without departing from the spirit and essence of the present disclosure. Therefore, the present disclosure is not restricted to the embodiments, and the protection scope of the present disclosure is determined by the appended claims.

What is claimed is:

1. An electromagnetic capacitive touch screen, comprising: a display; a capacitive module including a plurality of capacitive induction units, each capacitive induction unit including one or more electrodes; and an electromagnetic module including a plurality of electromagnetic induction units comprising a plurality of electromagnetic induction lines, wherein: the capacitive module and the electromagnetic module are located on a same layer; at least two transverse ones of the plurality of electromagnetic induction lines are disposed between two adjacent rows of the plurality of capacitive induction units arranged in a transverse direction, and a first plurality of current directions in at least two transverse electromagnetic induction lines are opposite one another; at least two longitudinal ones of the plurality of electromagnetic induction lines are disposed between two adjacent columns of a plurality of induction units arranged in a longitudinal direction, and a second plurality of current directions in at least two longitudinal electromagnetic induction lines are opposite one another; the one or more electrodes of the plurality of capacitive induction units, the at least two transverse electromagnetic induction lines, and the at least two longitudinal electromagnetic induction lines, are located in a same plane; one of the at least two transverse electromagnetic induction lines and the at least two longitudinal electromagnetic induction lines are connected through a bridging structure at a position where the at least two transverse electromagnetic induction lines and the at least two longitudinal electromagnetic induction lines are cross insulatively; and the bridging structure comprises an insulating layer and a bridging electrode layer, and the bridging electrode layer is located above an electrode layer of the plurality of capacitive induction units with the insulating layer therebetween, wherein the plurality of capacitive induction units each include two or more mutual capacitive drive electrodes and two or more induction electrodes with two or more drive electrodes or the two or more induction electrodes being connected to each other through a second bridging structure.

2. The electromagnetic capacitive touch screen according to claim 1, wherein a group of the at least two transverse electromagnetic induction lines and a group of the at least two longitudinal electromagnetic induction lines are arranged in a crisscross pattern.

3. The electromagnetic capacitive touch screen according to claim 2, wherein at least one of the plurality of capacitive induction units is disposed in a region surrounded by two of the at least two transverse electromagnetic induction lines and two of the at least two longitudinal electromagnetic induction lines.

4. The electromagnetic capacitive touch screen according to claim 3, wherein the plurality of capacitive induction units disposed in adjacent regions are connected through a first bridging structure.

5. The electromagnetic capacitive touch screen according to claim 1, wherein one of the two or more drive electrodes and one of the two or more induction electrodes are connected through the second bridging structure.

6. The electromagnetic capacitive touch screen according to claim 5, wherein respective ones of the at least one drive electrode are connected through a third bridging structure.

7. The electromagnetic capacitive touch screen according to claim 5, wherein respective ones of the two or more induction electrodes are connected through a fourth bridging structure.

8. The electromagnetic capacitive touch screen according to claim 1, wherein the insulating layer comprises a polymer-type covering layer or an inorganic-type passivation layer.

9. The electromagnetic capacitive touch screen according to claim 1, wherein the electrode layer or the bridging electrode layer comprises at least one material of indium tin oxide, nano-silver, Al, Cu, and Mo.

* * * * *